(No Model.)
A. E. TAYLOR.
Attachment for Driving Reins.
No. 241,090. Patented May 3, 1881.
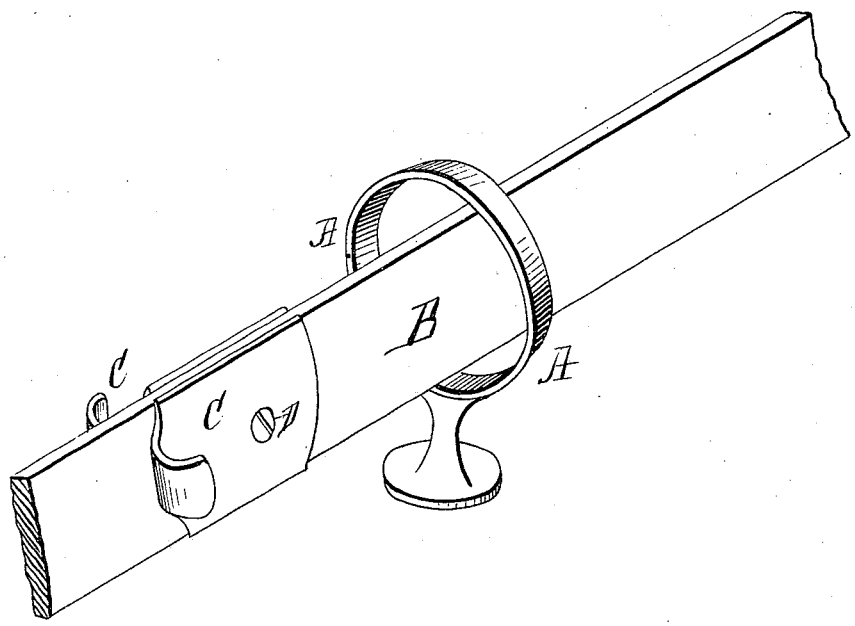
Witnesses:
W. C. McArthur
Wm. Zipperman
Inventor
Augustus E. Taylor
Per C. H. Watson & Co. Attorneys.

UNITED STATES PATENT OFFICE.

AUGUSTUS E. TAYLOR, OF NEW BRITAIN, CONNECTICUT.

ATTACHMENT FOR DRIVING-REINS.

SPECIFICATION forming part of Letters Patent No. 241,090, dated May 3, 1881.

Application filed October 1, 1880. (No model.)

*To all whom it may concern:*

Be it known that I, AUGUSTUS E. TAYLOR, of New Britain, in the county of Hartford and State of Connecticut, have invented certain new and useful Improvements in Attachments for Driving-Reins; and I do hereby declare that the following is a full, clear, and exact description of the invention, which will enable others skilled in the art to which it appertains to make and use the same, reference being had to the accompanying drawing, and to the letters of reference marked thereon, which form a part of this specification.

This invention relates to an improved attachment for driving-reins; and it consists in the construction and arrangement of parts, as will be hereinafter more fully set forth, and pointed out by the claim.

In the annexed drawing the figure represents a perspective view of my invention.

A represents a terret upon any harness-saddle, and B the reins passing through said terret. To the rear of the terret, at any suitable distance, are secured the hooks or catches C, said hooks being secured to the reins on either side thereof by means of screws or bolts D.

It is designed by this arrangement to dispense with the use of check-reins, overdraws, &c., and to simply and efficiently accomplish all their offices in an improved manner, simplifying the construction of the harness by doing away with straps and loops and making it present a neater appearance.

It will readily be seen that when the hooks are in the position shown, being larger than the terret, they will catch on its sides and prevent the rein from being pulled through.

The hooks are placed at a sufficent distance to check the horse and prevent his getting his head to the ground, and at the same time to allow it to be driven and guided by the reins in the usual manner, thus providing a sure method of checking the horse, and at the same time preserving all the former advantages of the reins.

Having thus fully described my invention, what I claim as new, and desire to secure by Letters Patent, is—

In a harness, the reins provided with hooks upon both sides thereof and in rear of the terret, operating in combination therewith, substantially as and for the purpose set forth.

In testimony that I claim the foregoing as my own I have hereto affixed my signature in presence of two witnesses.

AUGUSTUS E. TAYLOR.

Witnesses:
WALTER GLADDEN,
E. N. STANLEY.